United States Patent
Singh et al.

(10) Patent No.: US 10,140,161 B1
(45) Date of Patent: Nov. 27, 2018

(54) WORKLOAD AWARE DYNAMIC CPU PROCESSOR CORE ALLOCATION

(71) Applicant: EMC IP Holding Company LLC, Hopkinton, MA (US)

(72) Inventors: Sweetesh Singh, Westborough, MA (US); Ashish Kamra, Framingham, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/582,239

(22) Filed: Apr. 28, 2017

(51) Int. Cl.
*G06F 9/46* (2006.01)
*G06F 9/50* (2006.01)

(52) U.S. Cl.
CPC .................... *G06F 9/505* (2013.01)

(58) Field of Classification Search
None
See application file for complete search history.

(56) References Cited

U.S. PATENT DOCUMENTS

| | | | |
|---|---|---|---|
| 2008/0022282 A1* | 1/2008 | Cherkasova | G06F 9/505 718/102 |
| 2010/0169253 A1* | 7/2010 | Tan | G06F 9/5088 706/21 |
| 2010/0180275 A1* | 7/2010 | Neogi | G06F 1/3203 718/1 |
| 2015/0212840 A1* | 7/2015 | Biran | G06F 9/45558 718/1 |

OTHER PUBLICATIONS

Guenter, et al., *Managing Cost, Performanc, and Reliability Tradeoffs for Energy-Aware Server Provisioning*, 978-1-4244-9921-2/11, IEEE INFOCOM 2011, pp. 1332-1340.
Matthew, et al., *Energy-Efficient Content Delivery Networks using Cluster Shutdown*, 978-1-4799-0623-9/13, IEEE 2013 (10 pages).
Angelou, et al., *Improving Virtual Host Efficiency Through Resource and Interference Aware Scheduling*, arXiv:1601.07400v1, Jan. 2016 (8 pages).
EMC, *DELL EMC VMAX Embedded NAS Technical Overview*, Sep. 2016, White paper (22 pages).
Qu, et al., *A Workload-aware Resources Scheduling Method for Virtual Machine*, International Journal of Grid Distribution Computing, vol. 8, No. 1 (2015), pp. 247-258.
Soner, et al., *Integer Programming Based Heterogeneous CPU-GPU Cluster Scheduler for SLURM Resource Manager*, Partnership for Advanced Computing in Europe, www.prace-ri.eu, Jun. 2012 (11 pages).

* cited by examiner

*Primary Examiner* — Gregory A Kessler
(74) *Attorney, Agent, or Firm* — Anderson Gorecki LLP

(57) ABSTRACT

A method of workload aware dynamic CPU processor core allocation includes the steps of predicting estimated individual workloads for each emulation in a set of emulations for each decision period of a set of decision periods over a predictive time span. The method includes using, by a Mixed Integer Programming (MIP) engine, the predicted estimated individual workloads for each emulation in the set of emulations, a set of constraints, and an optimization function, to determine sets of CPU processor cores to be allocated to each emulation during each decision period over the predictive time span. The method further includes dynamically allocating, by the host computer system, the sets of CPU processor cores to each emulation during each decision period over the predictive time span based on the output from the MIP engine.

20 Claims, 5 Drawing Sheets

WORKLOAD AWARE DYNAMIC CPU PROCESSOR CORE ALLOCATION

CROSS REFERENCE TO RELATED APPLICATIONS

None

BACKGROUND

This disclosure relates to computing systems and related devices and methods, and, more particularly, to workload aware dynamic CPU processor core allocation in a computing system.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

In one aspect, a non-transitory tangible computer readable storage medium is provided that has stored thereon a computer program for implementing a method of workload aware dynamic CPU processor core allocation. The computer program includes a set of instructions which, when executed by a computer, cause the computer to perform a method including the step of predicting estimated individual workloads for each emulation in a set of emulations for each decision period of a set of decision periods over a predictive time span. The method also includes using, by a Mixed Integer Programming (MIP) engine, the predicted estimated individual workloads for each emulation in the set of emulations, a set of constraints, and an optimization function, to determine sets of CPU processor cores to be allocated to each emulation during each decision period over the predictive time span. The method further includes dynamically allocating, by the host computer system, the sets of CPU processor cores to each emulation during each decision period over the predictive time span based on the output from the MIP engine.

In some embodiments, the step of predicting estimated individual workloads for each emulation includes using a statistical model of each emulation's past workload history to predict the future workload levels of the emulations during the set of decision periods.

In certain embodiments, the step of predicting estimated individual workloads for each emulation includes using a machine learning regression algorithm or a neural network model to predict the future workload levels of the emulations during the set of decision periods.

In some embodiments, when the CPU processor cores of the host computer system are homogeneous, the set of constraints includes a first constraint specifying that for all decision periods, the sum of the number of CPU processor cores assigned all of the emulations is equal to a total number of CPU processor cores in the host computer system, and a second constraint specifying that for all decision periods, the normalized workload of each emulation, during the decision period, is less than the amount of collective processing capacity of the set of CPU processor cores allocated to that emulation.

In certain embodiments, when the CPU processor cores of the host computer system are homogeneous, the optimization function includes a first optimization feature to maximize the minimum spare capacity allocated to each emulation over the predictive time span to provide enhanced fault tolerance in the event of sudden workload changes, and a second optimization feature to minimize a number of CPU processor core reassignments between emulations between subsequent decision periods.

In some embodiments, when the CPU processor cores of the host computer system are heterogeneous, the set of constraints includes a first constraint specifying that for all decision periods, the sum of the number of CPU processor cores assigned the set of emulations is equal to the total number of CPU processor cores in the host computer system, a second constraint specifying that for all decision periods, each CPU processor cores is assigned to exactly one emulation and that no CPU processor core is unassigned, and a third constraint specifying that for all decision periods, and for all emulations, the sum of the capacity of the CPU processor cores assigned to any given emulation will be greater than or equal to the normalized predicted workload of the given emulation during the decision period.

In certain embodiments, when the CPU processor cores of the host computer system are heterogeneous, the optimization function includes an optimization feature to minimize a number of CPU processor core reassignments between emulations between subsequent decision periods.

In some embodiments, the method further includes the step of determining actual workload for each emulation during each decision period and using the actual workload to calculate updated estimated individual workloads for each emulation for subsequent decision periods of the predictive time span.

In one aspect, a host computer system includes a set of CPU processor cores, a set of emulations using physical resources provided by the set of CPU processor cores, and a workload predictor to generate estimated individual workloads for each emulation in a set of emulations for each decision period of a set of decision periods over a predictive time span. The host computer system also includes a Mixed Integer Programming (MIP) engine to determine sets of CPU processor cores to be allocated to each emulation during each decision period over the predictive time span based on the predicted estimated individual workloads for each emulation in the set of emulations generated by the workload predictor, a set of constraints, and an optimization function, and a hypervisor to dynamically allocate sets of CPU processor cores to each emulation during each decision period over the predictive time span based on the output from the MIP engine.

In some embodiments, the workload predictor uses a statistical model of each emulation's past workload history to predict the future workload levels of the emulations during the set of decision periods.

In certain embodiments, the workload predictor uses a machine learning regression algorithm or a neural network model to predict the future workload levels of the emulations during the set of decision periods.

In some embodiments, when the CPU processor cores of the host computer system are homogeneous, the set of constraints includes a first constraint specifying that for all decision periods, the sum of the number of CPU processor cores assigned all of the emulations is equal to a total number of CPU processor cores in the host computer system, and a second constraint specifying that for all decision periods, the normalized workload of each emulation, during the decision period, is less than the amount of collective processing capacity of the set of CPU processor cores allocated to that emulation.

In certain embodiments, when the CPU processor cores of the host computer system are homogeneous, the optimization function includes a first optimization feature to maximize the minimum spare capacity allocated to each emulation over the predictive time span to provide enhanced fault tolerance in the event of sudden workload changes, and a second optimization feature to minimize a number of CPU processor core reassignments between emulations between subsequent decision periods.

In some embodiments, when the CPU processor cores of the host computer system are heterogeneous, the set of constraints includes a first constraint specifying that for all decision periods, the sum of the number of CPU processor cores assigned the set of emulations is equal to the total number of CPU processor cores in the host computer system, a second constraint specifying that for all decision periods, each CPU processor cores is assigned to exactly one emulation and that no CPU processor core is unassigned, and a third constraint specifying that for all decision periods, and for all emulations, the sum of the capacity of the CPU processor cores assigned to any given emulation will be greater than or equal to the normalized predicted workload of the given emulation during the decision period.

In certain embodiments, when the CPU processor cores of the host computer system are heterogeneous, the optimization function includes an optimization feature to minimize a number of CPU processor core reassignments between emulations between subsequent decision periods.

In some embodiments, the workload predictor is configured to determine actual workload for each emulation during each decision period and, using the actual workload, to calculate updated estimated individual workloads for each emulation for subsequent decision periods of the predictive time span.

DETAILED DESCRIPTION

This disclosure is based, at least in part, on the realization that it would be advantageous to provide workload aware dynamic CPU processor core allocation in a host computer system.

Figure 1:
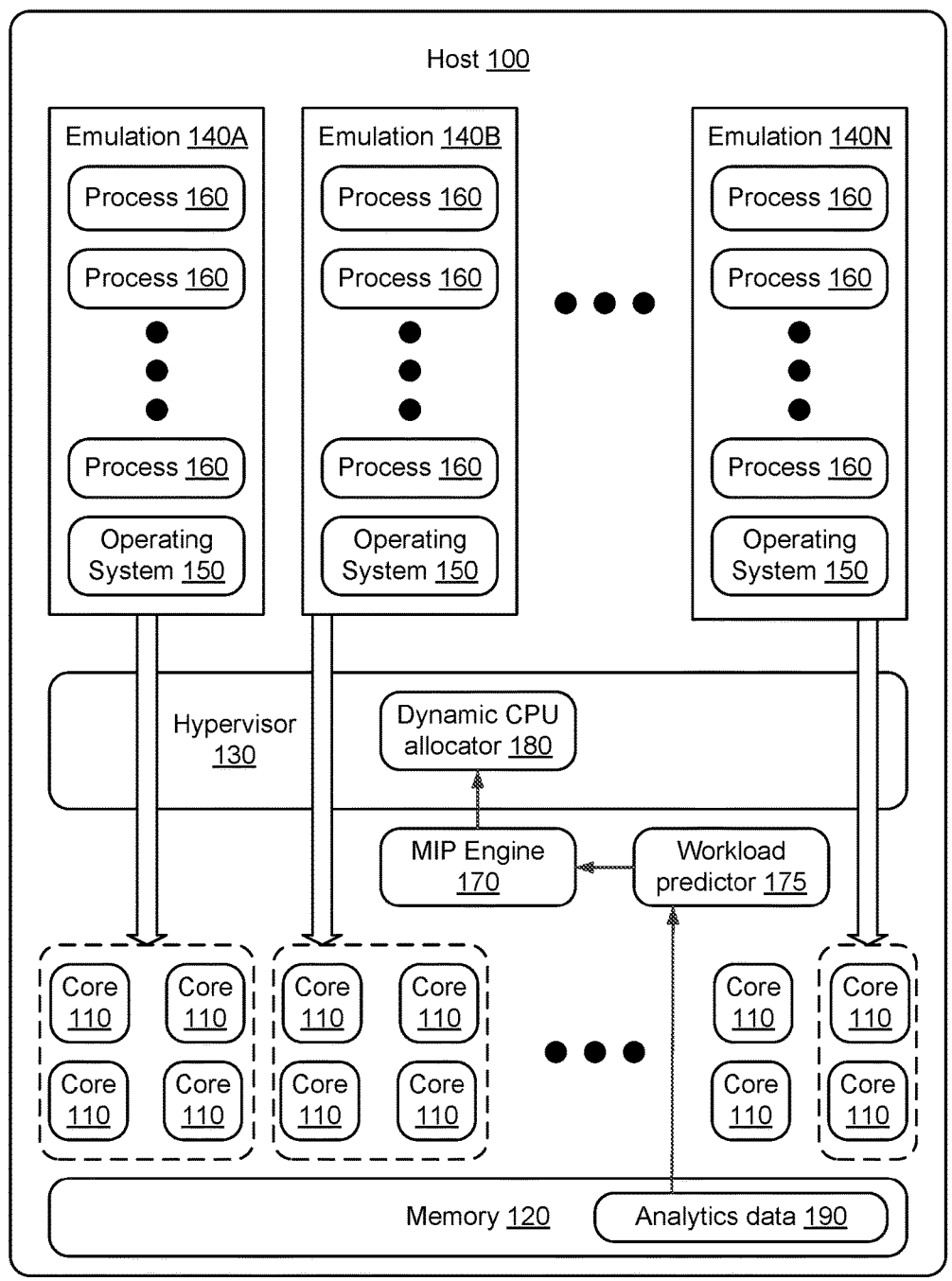
FIGS. 1-2 are functional block diagrams of an example host computer system configured to provide workload aware dynamic CPU processor core allocation showing CPU allocations during two decision periods according to an embodiment.

FIG. 1 shows an example host computer system 100 configured to provide workload aware dynamic CPU processor core allocation according to an embodiment. As shown in FIG. 1, a host computer system 100 has a number of CPU processor cores 110, memory 120, and other physical resources. A hypervisor 130 abstracts the physical resources from emulations 140 and allocates physical resources of host computer system 100 for use by emulations 140. In some implementations emulations 140 are virtual servers. In other implementations, emulations 140 may be other groups of processes. In some embodiments, each emulation 140 has an operating system 150 and one or more application processes 160.

Emulations 140 may have static resource requirements or may have dynamically varying resource requirements. According to an implementation, host computer system 100 includes a Mixed Integer Programming (MIP) engine 170 configured to determine anticipated workload requirements of the emulations 140 running on host computer system 100 and to specify CPU processor core allocation. In one implementation hypervisor 130 has a dynamic CPU allocation system 180 configured to dynamically allocate processing resources such as CPU processor cores 110 to the emulations 140 based on instructions from the MIP engine 170.

Figure 2:
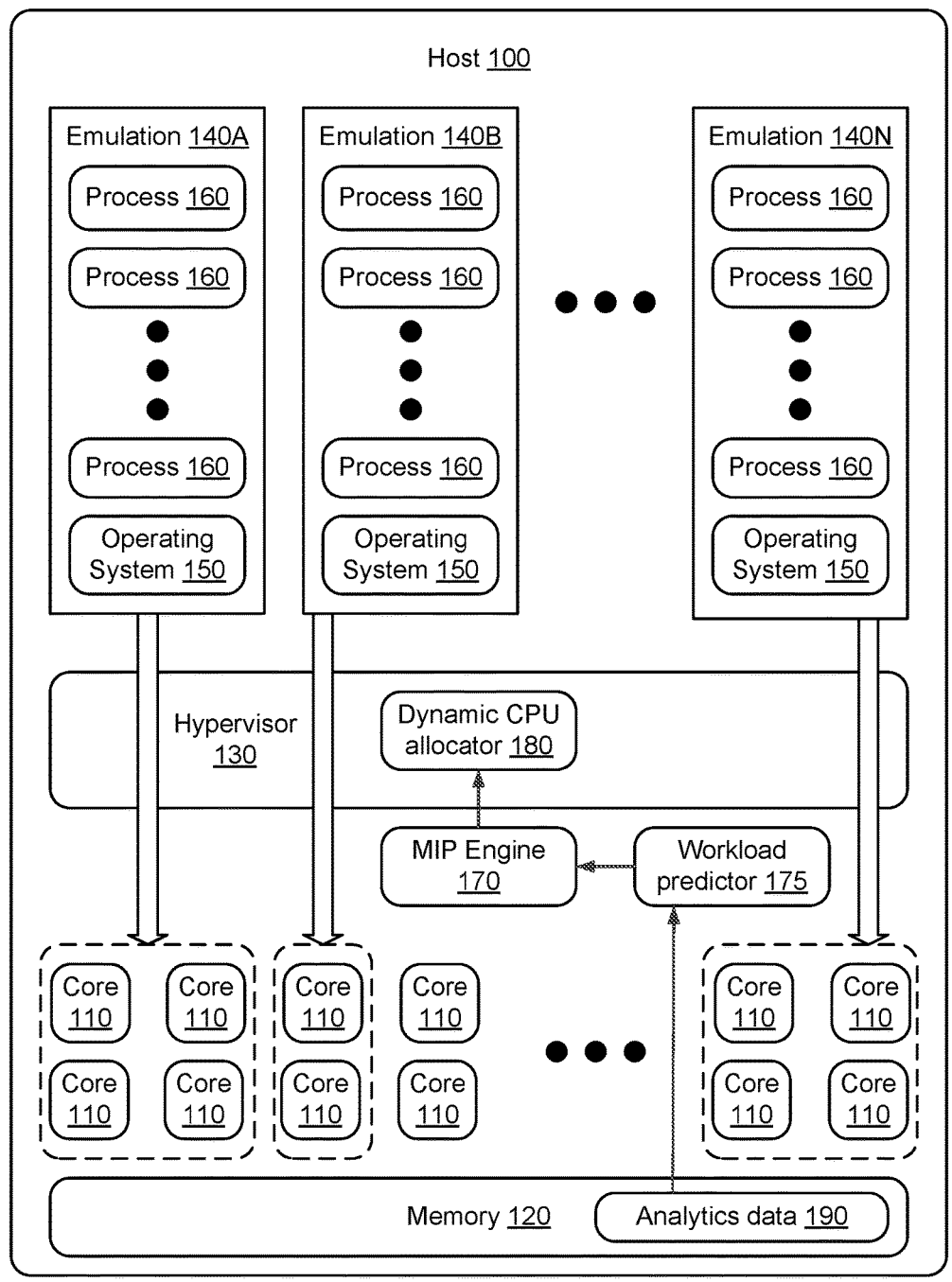

FIG. 1 shows an example host computer system 100 during a first decision period, during which period hypervisor 130 has allocated four CPU processor cores 110 to emulation 140A, allocated four CPU processor cores 110 to emulation 140B, and allocated two CPU processor cores 110 to emulation 140N. FIG. 2 shows the example host computer system 100 during a subsequent decision period, during which period hypervisor 130 has allocated four CPU processor cores 110 to emulation 140A, allocated two CPU processor cores 110 to emulation 140B, and allocated four CPU processor cores 110 to emulation 140N. By dynamically allocating physical resources such as CPU processor cores 110 to the emulations 140 based on anticipated workload during upcoming decision periods, it is possible to better match process workload with system resources to accelerate handling of work by the host computer system 100.

In one implementation, a workload predictor 175 accesses analytics data 190 stored, for example, in memory 120. Based on historical usage patterns determined from analytics data 190, the workload predictor 175 determines projected workloads of each of the emulations for each decision period over a predictive time span.

For example, if a decision period length is set to one half hour, and the predictive time span is set to twenty four hours, the workload predictor 175 will determine expected workloads for each of the emulations 140 for each of the upcoming half hour intervals over a period of twenty four hours. This is just an example, as both the decision period and predictive time span will depend on the end use and implementation.

In some implementations the decision period $\Delta t$ is chosen to be sufficiently large to provide enough time to switch CPU processor cores 110 between emulations 140 as well as to allow the processes 160 to stabilize after switching, and to ensure that frequent switching is avoided. Switching a CPU processor core 110 from a first emulation 140 to a second emulation 140 requires the state of the processes 160 being handled by the CPU processor core 110 to be stored and transferred, and hence requires considerable book keeping. Since transferring CPU processor core assignment between emulations 140 is not instantaneous, preferably the decision period $\Delta t$ is selected to enable the transfer of responsibility to be accomplished and to also then enable the CPU processor core 110 to perform meaningful work in connection with processing the workload of the second emulation 140 once the transfer of responsibility has been completed.

In some embodiments each decision period in the predictive time span is the same. In the example set forth above, the decision periods throughout the 24 hour predicted time span are all the same, and set to be one half hour in length. In other embodiments, different length decision periods may be used within a given predictive time span. For example, shorter decision periods may be used during periods of time which historically have greater workload fluctuation, and longer decision periods may be used during periods of historically lesser workload fluctuation.

Figure 3:
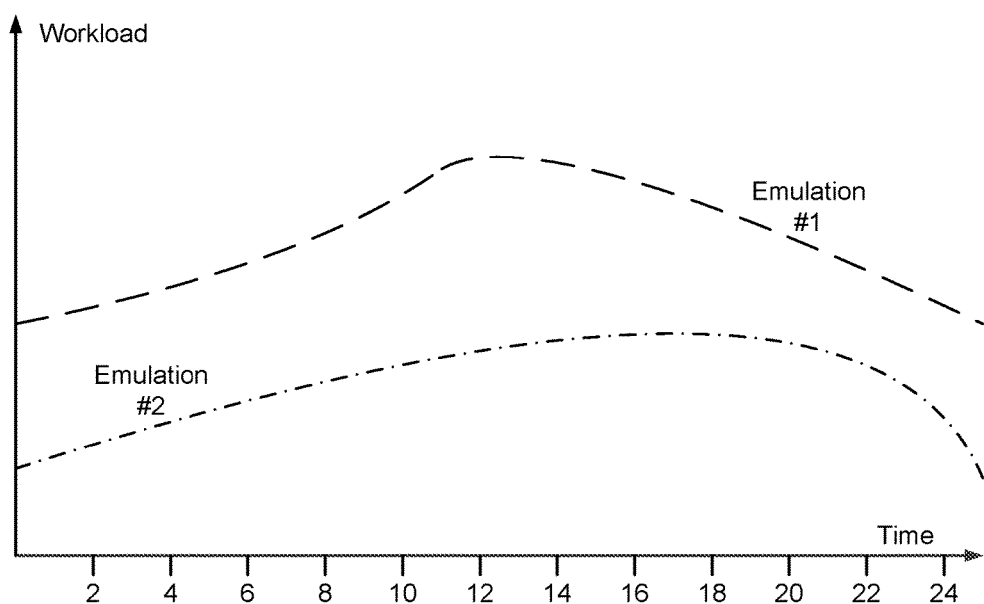
FIG. 3 is a graph showing example normalized workload variations of emulations over time.

According to an embodiment, predictive analytics are used to forecast work levels of emulations 140, for each decision period, over a predictive time span. FIG. 3 is a graph showing a hypothetical example showing the expected workloads of two emulations over a predictive time span which, in this example, is a 24 hour period of time. For simplicity, the 24 hour predictive time span has been divided into twelve decision periods, each of which is two hours long. The Y-axis, labeled "workload", has intentionally not been labeled with any units, as the manner in which "workload" of an emulation 140 is calculated may vary considerably depending on the particular metrics measured. Example workload metrics may include memory access operations, CPU activity, or any other manner of measuring the amount of processing power required by the emulation 140 over time. In one implementation the workload of each emulation 140 is normalized relative to the processing capacity of the host computer system 100 and is estimated as a percentage of the total processing capacity of the host computer system 100.

As shown in FIGS. 1-2, the host computer system 100 collects information about the workload of each emulation 140 over time and stores the collected information as analytics data 190. Analytics data 190 is periodically updated as additional workload information of the emulations 140 is obtained over time, based on the actual workload processed by each emulation 140. In one implementation workload predictor 175 looks at statistical models of emulation past workload history (derived from analytics data 190) to predict future workload levels of each of the emulations 140 over each decision period during an upcoming predictive time span.

In some implementations, workload predictor 175 implements workload forecasting using statistical modelling such as ARIMA (Autoregressive Integrated Moving Average), AR (Autoregressive Model), MA (Moving Average), or ARMA (Autoregressive Moving Average) models. These models make use of the trend, cycle, seasonal, and irregular components of a workload time series and predict the future workload with reasonable confidence for a number (t) of upcoming decision periods ($\Delta t$) over a predictive time span. The decision period ($\Delta t$) can vary from 5 minutes to 30 minutes or more, depending upon the predictability of the number of requests which in turn is decided by the above four components. In other implementations, instead of using statistical models, the workload predictor 175 implements a machine learning regression algorithm or a neural network model to predict the future workload.

Projected workloads are provided from workload predictor 175 to MIP engine 170. MIP engine 170 uses the predicted workloads for the emulations 140, a set of constraints 420, and a set of optimization functions 430, to allocate a number of available CPU processor cores 110 to each of the emulations 140 for each of the upcoming decision periods over the predictive time span. For example, as shown in FIGS. 1 and 2, emulation 140B is allocated four CPU processor cores 110 during a first decision period and is allocated two CPU processor cores 110 during a second decision period. Likewise, emulation 140N is allocated two CPU processor cores 110 during the first decision period and is allocated four CPU processor cores 110 during the second decision period. By dynamically allocating CPU processor cores 110 to the emulations 140 based on anticipated workload (subject to the constraints and optimizations discussed below), the hypervisor 130 is better able to match processing power to workload to optimize performance of host computer system 100.

In some implementations, the host computer system 100 will have CPU processor cores 110 with identical characteristics. In other implementations, the CPU processor cores 110 of host computer system 100 are not identical. The particular constraints 420 and optimization functions 430 used by MIP engine 170 will vary depending on the characteristics of the CPU processor cores 110.

In some implementations all of the CPU processor cores 110 of host computer system 100 will be identical, or sufficiently identical, to assume that each CPU processor core 110 is capable of implementing the same amount of work during the decision period. Where all CPU processor cores 110 are assumed to be capable of implementing substantially the same amount of work, the CPU processor cores will be referred to herein as "homogenous". Homogenous cores do not need to be one hundred percent identical, just sufficiently alike to enable the assumption regarding workload capabilities to be considered reasonable. When cores are homogeneous, since the cores are interchangeable, it is possible to simply specify a number of cores to be assigned to each of the emulations during each decision period.

In some implementations the CPU processor cores 110 of the host computer system 100 may have different load serving capacity, clock frequency, cache size, or affinity towards different processes. In these implementations the assumption that the CPU processor cores are each capable of implementing the same amount of work during the decision period does not hold, and hence the CPU processor cores are not viewed as interchangeable. CPU processor cores that are not viewed as interchangeable will be referred to herein as "heterogeneous". When cores are heterogeneous, specific individual cores will be assigned to specific emulations during each decision period.

Homogenous CPU Processor Cores

If the cores are considered homogeneous, it will be assumed that there are "m" CPU processor cores and "n" emulations in the host computer system 100. The workload predictor 175 generates a set of predicted future workloads for each of the emulations, such as the expected future 10/read-write request levels of the emulations 140, for a set (t) of upcoming decision periods $\Delta t$. The workload aware dynamic CPU core allocation process ensures that the CPU processor core allocations across different emulations 140 are sufficient to serve the predicted maximum load of each emulation 140 during each decision period over the predictive time span while maintaining other constraints discussed below.

In the case of homogenous CPU processor cores, it is assumed that all "m" CPU processor cores are identical in all respects. Hence, the MIP engine 170 does not need to assign particular CPU processor cores to particular emulations 140, but rather only needs to specify how many CPU processor cores should be allocated to each emulation 140. In effect, the MIP engine 170 will return a vector specifying a number of CPU processor cores to be assigned to each emulation. An example vector is set forth below in TABLE I:

| Emulation ID | Number of CPU processor cores |
|---|---|
| 1 | 5 |
| 2 | 10 |
| 3 | 12 |
| n | 3 |

To arrive at the number of CPU processor cores that should be assigned to each emulation during each decision period over the predictive time span, the Mixed Integer Programming (MIP) engine 170 uses the predicted workload for each emulation, during each decision period over the predictive time span, a set of constraints, and one or more optimization functions, to arrive at the CPU processor core allocations for each emulation during each of the decision periods.

Specifically, let $\lambda_i(t)$ be defined as the maximum predicted normalized workload of emulation "i" for decision period $\Delta t$ at time t; and $N_i(t)$ be defined as the number of CPU processor cores for emulation "i" required to serve the normalized workload $\lambda_i(t)$ during the decision period.

Where the CPU processor cores are considered homogeneous, the constraints applied by the MIP engine, according to an implementation, include:

$$\forall t \sum_{i=1}^{i=n} N_i(t) = m \qquad \text{Constraint (1)}$$

$$\forall t \; \forall i \lambda_i(t) \leq N_i(t) \qquad \text{Constraint (2)}$$

Constraint (1) specifies that, for all decision periods ($\forall t$), the sum of the number of CPU processor cores assigned all of the emulations is required to be equal to the total number of m CPU processor cores 110 in host computer system 100. This ensures that the MIP engine 170 does not allocate more CPU processor cores than are available in host computer system 100.

Constraint (2) specifies that, for all decision periods ($\forall t$), the normalized workload of each emulation, during the decision period, is less than the amount of collective processing capacity of the set of CPU processor cores 110 allocated to that emulation. Thus, constraint (2) causes the MIP engine 170 to dynamically distributes CPU processor core resources within the host computer system 100 to emulations 140 based on anticipated workload variations of the emulations 140 over time.

By normalizing the workload, and ensuring that the normalized workload of each emulation is less than or equal to the amount of work able to be performed by the set of CPU processor cores assigned to the emulation during the decision period, it is possible to distribute spare capacity across all emulations based on the relative workload of the emulations to ensure that spare capacity is not concentrated on a small subset of the emulations. Specifically, where there is spare capacity, Constraint (2) ensures that all emulations are provided with sufficient core access to meet the demands of that emulation. It further distributes spare capacity based on the expected normalized workloads of the emulations so that an emulation with higher normalized workload will receive increased spare capacity relative to an emulation with a lower normalized workload.

Thus, with homogenous cores, constraint (1) ensures that at all the times, total number of CPU processor cores across all processes is bounded by number "m" which is the total number of CPU processor cores in the system. Constraint 2 is used for making sure that normalized load $\lambda_i(t)$ at time t of emulation i, is being served by number of CPU processor cores allocated to the i-th emulation. Since the load is normalized relative to the processing capacity of the set of CPU processor cores 110 in host computer system 100, Constraint 2 ensures that any additional spare capacity is fairly allocated between emulations 140.

In addition to the constraints, it is desirable to both maximize fault tolerance in the event of a sudden unexpected increase in workload of a given emulation, while also minimizing movement of CPU processor cores between emulations since reassignment of CPU processor cores incurs a performance penalty.

According to an implementation, the following optimization function (3) is used by the MIP engine 170:

$$\max(\min_{i \in n} (N_i(t) - \lambda_i(t)))) \qquad \text{Optimization function (3)}$$

$$\text{then } \min\left(\sum_{i=1}^{i=n} |N_i(t) - N_i(t-1)|\right)$$

The first part of optimization function (3) serves to maximize the fault tolerance in terms of workload prediction, for example to enable the host computer system 100 to accommodate sudden increases in workload by a particular emulation. An example increase in workload might be, for example, an unexpected increase in the number of read/write memory access operations by the CPU processor cores assigned to the emulation. Optimization function (3) looks at the minimum spare capacity assigned to each emulation at each decision period during the predictive time span. By seeking to maximize the minimum spare capacity allocated to each emulation, the optimization function is able to provide enhanced fault tolerance in the event of sudden workload changes or error/fault conditions by more evenly distributing spare capacity across the emulations.

As noted herein, movement of CPU processor cores incurs cost in terms of time, performance, bookkeeping and reliability. Hence, it is desirable to minimize movement of CPU processor core assignments between emulations 140. The second part of optimization function (3) serves to minimize the number of CPU processor core reassignments. Specifically, the second part of optimization function (3) compares the number of CPU processor cores 110 assigned to an emulation 140 at time t with the number of CPU processor cores 110 assigned to the same emulation 140 at time t-1. This reflects the difference in number of CPU processor cores 110 assigned to the emulation 140 or, more particularly, the number of CPU processor core reassignments associated with the emulation 140, during a successive decision periods. By minimizing the number of reassignments it is possible to seek to minimize the number of CPU processor core changes and, hence, to minimize the performance degradation associated with reassigning CPU processor cores 110 between emulations 140.

In one implementation a standard Mixed-Integer Programming (MIP) engine 170 is used to implement the constraints (1) and (2), and optimization function (3) to arrive at a set of CPU processor cores $N_i(t)$ for each decision period which would be the number of CPU processor cores that should be allocated to emulation i at time t to serve the anticipated load of the emulation during that decision period.

Heterogeneous CPU Processor Cores

In the case of heterogeneous CPU processor cores 110, it is assumed that the CPU processor cores 110 are not identical in all respects. Hence, to meet the work requirements of the emulations 140, the MIP engine 170 will need to assign particular CPU processor cores 110 to particular emulations 140 for each decision period. In effect, the MIP engine 170 will return an array specifying which CPU processor cores 110 are assigned to each emulation. An example array is set forth below in TABLE II:

|  | Emulation #1 | Emulation #2 | Emulation #3 | Emulation #4 | Emulation #5 |
|---|---|---|---|---|---|
| CPU processor core #1 | 1 | 0 | 0 | 0 | 0 |
| CPU processor core #2 | 1 | 0 | 0 | 0 | 0 |
| CPU processor core #3 | 0 | 1 | 0 | 0 | 0 |
| CPU processor core #4 | 0 | 1 | 0 | 0 | 0 |
| CPU processor core #5 | 0 | 0 | 1 | 0 | 0 |
| CPU processor core #6 | 0 | 0 | 1 | 0 | 0 |
| CPU processor core #7 | 0 | 0 | 0 | 1 | 0 |
| CPU processor core #8 | 0 | 0 | 0 | 1 | 0 |
| CPU processor core #9 | 0 | 0 | 0 | 0 | 1 |

In this array, a value of 1 indicates that a CPU processor core 110 is assigned to an emulation 140. A value of 0 indicates that the CPU processor core 110 is not assigned to the particular emulation 140. For example, in the above TABLE II, during an example decision period, CPU processor cores 1 and 2 are assigned to emulation #1, CPU processor cores 3 and 4 are assigned to emulation #2, etc. When a CPU processor core 110 is assigned to a particular emulation 140 it will not be assigned to other emulations 140 on host computer system 100, to present a CPU processor core 110 from being simultaneously assigned to more than one emulation 140 during a given decision period.

In the case of heterogeneous CPU processor cores, it will be assumed that CPU processor core numbered j, has serving capacity $C_j$. The values of Cj will be different for different CPU processor cores 110 due to the heterogeneous nature of the CPU processor cores. The indicator variable U will be defined, such that:

$$U_{ij}(t) = \begin{cases} 1 \text{ if emulation } t \text{ has core } j \text{ assigned to it at time } t \\ \text{else } 0 \end{cases}$$

The above TABLE II gives an example matrix created from values $U_{ij}$ at a particular decision period.

According to an implementation, to determine which CPU processor cores should be assigned to which emulations, the MIP engine 170 is supplied with a set of constraints.

$$\forall t \sum_{t=1}^{t=n} \sum_{j=1}^{j=m} U_{tj}(t) = m \qquad \text{Constraint (1)}$$

Constraint (1) specifies that, for all decision periods t, the sum of the number of CPU processor cores assigned the set of emulations 140 is required to be equal to the total number of m CPU processor cores 110 in host computer system 100. This ensures that the MIP engine 170 does not allocate more CPU processor cores 110 than are available in host computer system 100.

$$\forall t \forall j \sum_{t=1}^{t=n} U_{tj}(t) = 1 \qquad \text{Constraint (2)}$$

Constraint (2) specifies that, for all decision periods t, and for all CPU processor cores j, the number of emulations that the CPU processor core is assigned to is equal to one. This ensures that a CPU processor core is assigned to one and only one emulation 140 during each decision period, and hence prevents a CPU processor core j from being idle (unassigned to any CPU processor core during a decision period), or from improperly being assigned to multiple emulations 140 during the same decision period.

$$\forall t \forall i \sum_{j=1}^{j=m} U_{tj}(t) * C_j \geq \lambda_i(t) \qquad \text{Constraint (3)}$$

Constraint (3) specifies that, for all decision periods t, and for all emulations i, the sum of the capacity of the CPU processor cores assigned to the $i^{th}$ emulation will be greater than or equal to the normalized predicted workload of the $i^{th}$ emulation during the decision period. As noted above, by using the normalized workload values, this constraint also helps to distribute spare capacity between emulations in relative proportion of the emulation workloads.

In addition to the constraints, it is desirable to minimize movement of CPU processor cores 110 between emulations 140, since reassignment of CPU processor cores 110 incurs a performance penalty. According to an implementation, one or more optimization functions may be applied to minimize CPU processor core transfers between emulations.

$$\min \sum_{i=1}^{i=n} \sum_{j=1}^{j=m} |U_{ij}(t) - U_{ij}(t-1)| \qquad \text{Optimization function (4)}$$

Optimization function (4) states that, during each decision period, for each emulation, and for each CPU processor core 110, the number of changes from one decision period to the next should be minimized.

As noted herein, reassignment of CPU processor cores between emulations 140 incurs cost in terms of time, performance, bookkeeping and reliability. Hence, it is desirable to minimize movement of CPU processor core assignments between emulations. Optimization function (4) serves to minimize the number of CPU processor core changes. Specifically, optimization function (4) determines whether the same CPU processor core 110 is assigned to the same emulation 140 at time t and at time t−1. The optimization function does this for all n emulations, and for all m CPU processor cores. Specifically, by comparing $U_{ij}(t)$ with $U_{ij}(t-1)$ it is possible to detect CPU processor core reassignments. By minimizing the number of CPU processor core reassignments it is possible to seek to minimize the number of CPU processor core changes and, hence, to minimize the performance degradation associated with reassigning CPU processor cores between emulations.

Since the MIP engine 170 performs this process at each decision period within a predictive time span, the optimization function (4) enables the MIP engine 170 to take a longer view of whether a CPU processor core should be reassigned between emulations. if the anticipated predicted workload levels of a given emulation would cause the emulation to be assigned 10 cores at decision period t1, 9 cores at decision period t2, and 10 cores at decision period t3, optimization function (4) may be used to determine that the emulation should be continuously assigned 10 cores during all three decision periods (t1, t2, and t3) to reduce the number of core movements within host computer system 100. The optimization function (4) thus enables the MIP engine 170 to optionally not re-assign CPU processor cores based on workload only, and enables the MIP engine to also take into account the preference for not reassigning CPU processor cores. In one implementation, MIP engine is implemented as a standard MIP solver that is used to produce matrix $U_{ij}$ for each decision period (t) over the predictive time span.

Figure 4:
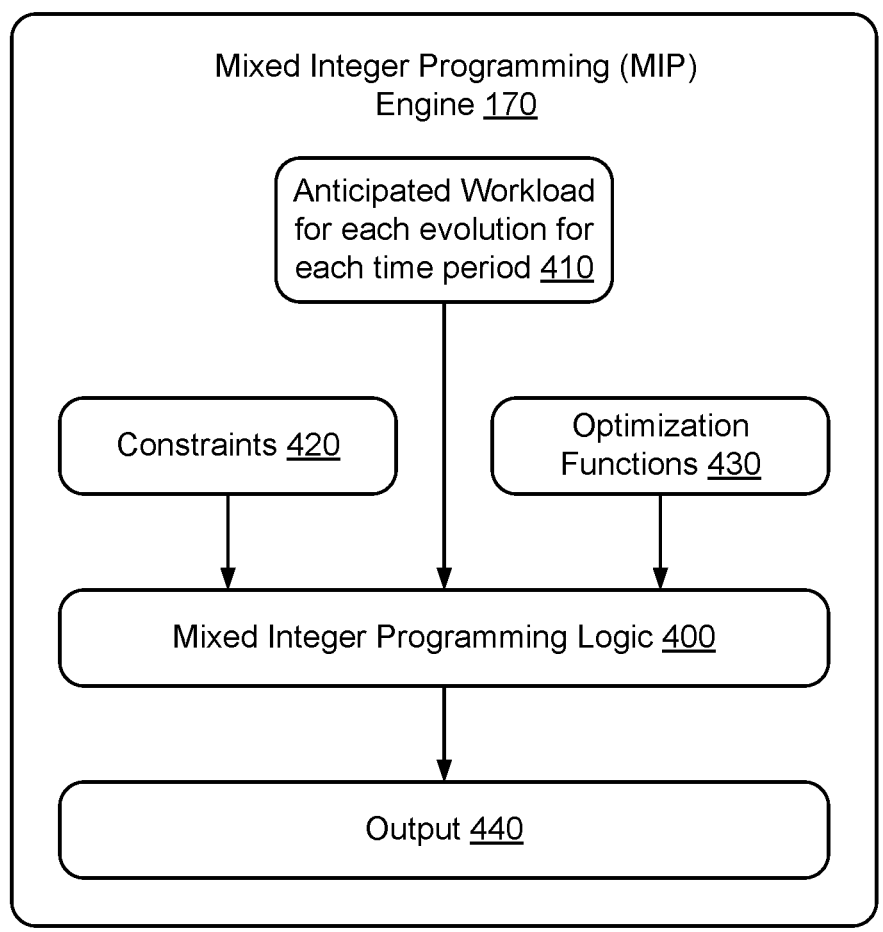
FIG. 4 is a block diagram of a Mixed Integer Programming (MIP) engine for use in the system of FIGS. 1-2 according to an embodiment.

FIG. 4 shows an example MIP engine 170 according to some embodiments. As shown in FIG. 4, MIP engine 170 includes Mixed Integer Programming (MIP) logic 400 configured to receive as inputs the anticipated workload for each emulation for each decision period during the predictive time span 410, the constraints 420 (discussed above), and the optimization functions 430 (also discussed above). The selection of constraints and optimization functions will depend on the nature of the cores to be allocated to the emulations, for example depending on whether the cores are homogeneous or heterogeneous. The MIP logic solves the MIP problem and provides, as output 440, a set of CPU processor cores to be assigned to each of the emulations.

Mixed integer programming problems may be solved using any number of known methods. For example, one method to solving a MIP problem is commonly referred to Branch and Bound. This method begins by finding an optimal solution to the "relaxation" of the problem without the integer constraints (via standard linear or nonlinear optimization methods). If, in this solution, the decision variables with integer constraints have integer values, then no further work is required. If one or more integer variables have non-integral solutions, the Branch and Bound method chooses one such variable and "branches," creating two new sub-problems where the value of that variable is more tightly constrained. These sub-problems are solved and the process is repeated, until a solution that satisfies all of the integer constraints is found.

Alternative methods, such as genetic and evolutionary algorithms, randomly generate candidate solutions that satisfy the integer constraints. Such initial solutions are usually far from optimal, but these methods then transform existing solutions into new candidate solutions, through methods such as integer- or permutation-preserving mutation and crossover, that continue to satisfy the integer constraints, but may have better objective values. This process is repeated until a sufficiently "good solution", albeit potentially non-optimal solution, is found.

In some embodiments Mixed Integer Programming Logic 400 is configured to solve the mixed integer programming problem based on the input workloads, constraints, and optimization functions. Since solutions to mixed integer programming problems, and MIP engines designed to solve these types of problems are known in the art, additional details of MIP engine 170 has been omitted to prevent obfuscation of the invention.

Figure 5:
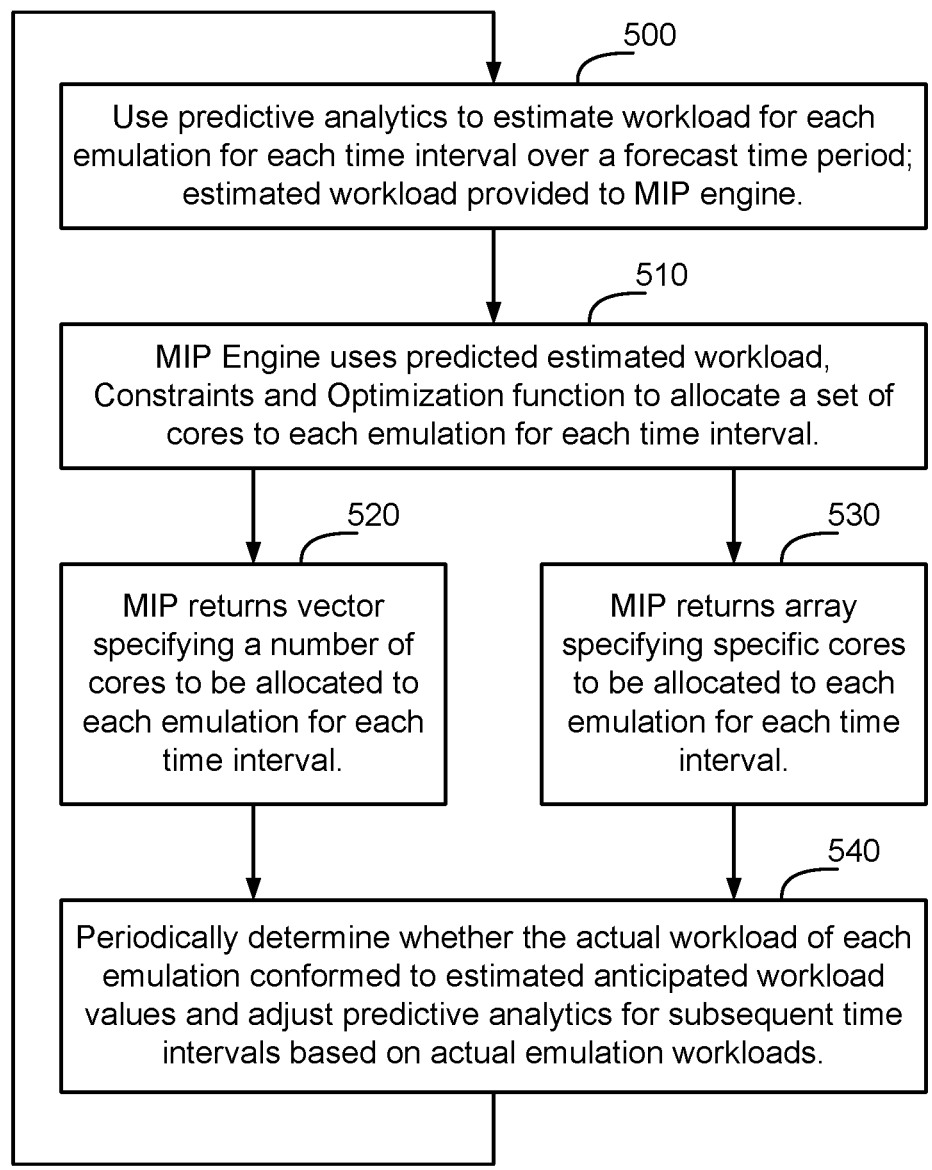
FIG. 5 is a flow chart of an example method of workload aware dynamic CPU processor core allocation according to an embodiment.

FIG. 5 is a flow chart of an example process of implementing workload aware dynamic CPU processor core allocation according to an embodiment. In the implementation shown in FIG. 5, at block 500 the process uses predictive analytics to estimate the workload for each emulation for each decision period over a predictive time span. These estimated workload values are provided to the MIP engine 170.

At block 510 the MIP engine 170 uses the predicted estimated anticipated workload values 410, the constraint(s) 420, and optimization function(s) 430, to allocate a set of CPU processor cores 110 to each emulation for each decision period. As shown in Block 520, if the CPU processor cores 110 are homogenous, the output 440 returned by the MIP engine 170 is a vector specifying a number of CPU processor cores to be allocated to each emulation for each decision period during the predictive time span. As shown in Block 530, if the CPU processor cores 110 are heterogeneous, the output 440 returned by the MIP engine 170 is an array specifying specific CPU processor cores 110 to be allocated to each emulation for each decision period during the predictive time span.

At block 540, optionally, after each decision period or at some other desired frequency, the host computer system 100 monitors the actual workload of each emulation during the decision period. For example, CPU processor core usage data may be logged for each CPU processor core during each decision period. The host computer system 100 uses this logged data to determine whether the actual load conformed with the predicted anticipated estimate workload for the decision period. The actual workload may be used to update the analytics data 190 and used by the workload predictor 175 to update workload estimates for emulations 140 for subsequent decision periods. The updated workload estimates, in some embodiments, are used periodically by MIP engine 170 to refine CPU allocation by recalculating output 440 based on updated analytics data 190.

The following reference numbers are used in the drawings:

100 host computer system
110 CPU processor core
120 memory
130 hypervisor
140 emulation
150 operating system
160 process
170 Mixed Integer Programming (MIP) engine
175 workload predictor
180 dynamic CPU allocation
190 analytics data
400 MIP logic
410 anticipated workload values
420 constraints
430 optimization function
440 output The methods described herein may be implemented as software configured to be executed in control logic such as contained in a CPU of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer-readable storage medium having stored thereon a computer program for implementing a method of workload aware dynamic CPU processor core allocation in a host computer system, the computer program including a set of instructions which, when executed by a computer, cause the computer to perform a method comprising the steps of:
    predicting estimated individual workloads for each emulation in a set of emulations for each decision period of a set of decision periods over a predictive time span;
    using, by a Mixed Integer Programming (MIP) engine, the predicted estimated individual workloads for each emulation in the set of emulations, a set of constraints, and an optimization function, to determine sets of CPU processor cores to be allocated to each emulation during each decision period over the predictive time span; and
    dynamically allocating, by the host computer system, the sets of CPU processor cores to each emulation during each decision period over the predictive time span based on an output from the MIP engine;
    wherein when the CPU processor cores of the host computer system are homogeneous, the set of constraints comprises:
        a first constraint specifying that for all decision periods, the sum of the number of CPU processor cores assigned to all of the emulations is equal to a total number of CPU processor cores in the host computer system; and
        a second constraint specifying that for all decision periods, the normalized workload of each emulation, during the decision period, is less than the amount of collective processing capacity of the set of CPU processor cores allocated to that emulation.

2. The non-transitory tangible computer-readable storage medium of claim 1, wherein the step of predicting estimated individual workloads for each emulation comprises using a statistical model of each emulation's past workload history to predict the future workload levels of the emulations during the set of decision periods.

3. The non-transitory tangible computer-readable storage medium of claim 1, wherein the step of predicting estimated individual workloads for each emulation comprises using a machine learning regression algorithm or a neural network model to predict the future workload levels of the emulations during the set of decision periods.

4. The non-transitory tangible computer-readable storage medium of claim 1, wherein when the CPU processor cores of the host computer system are homogeneous, the optimization function comprises:
    a first optimization feature to maximize the minimum spare capacity allocated to each emulation over the predictive time span to provide enhanced fault tolerance in the event of sudden workload changes; and
    a second optimization feature to minimize a number of CPU processor core reassignments between emulations between subsequent decision periods.

5. The non-transitory tangible computer-readable storage medium of claim 1, further comprising instructions which, when executed by the computer, cause the computer to further perform a method step of determining actual workload for each emulation during each decision period and using the actual workload to calculate updated estimated individual workloads for each emulation for subsequent decision periods of the predictive time span.

6. A non-transitory tangible computer-readable storage medium, having stored thereon a computer program for implementing a method of workload aware dynamic CPU processor core allocation in a host computer system, the computer program including a set of instructions which, when executed by a computer, cause the computer to perform a method comprising the steps of:
    predicting estimated individual workloads for each emulation in a set of emulations for each decision period of a set of decision periods over a predictive time span;
    using, by a Mixed Integer Programming (MIP) engine, the predicted estimated individual workloads for each emulation in the set of emulations, a set of constraints, and an optimization function, to determine sets of CPU processor cores to be allocated to each emulation during each decision period over the predictive time span; and
    dynamically allocating, by the host computer system, the sets of CPU processor cores to each emulation during each decision period over the predictive time span based on an output from the MIP engine;
    wherein when the CPU processor cores of the host computer system are heterogeneous, the set of constraints comprises:
        a first constraint specifying that for all decision periods, the sum of the number of CPU processor cores assigned to the set of emulations is equal to the total number of CPU processor cores in the host computer system;

a second constraint specifying that for all decision periods, each CPU processor core is assigned to exactly one emulation and that no CPU processor core is unassigned; and a third constraint specifying that for all decision periods, and for all emulations, the sum of the capacity of the CPU processor cores assigned to any given emulation will be greater than or equal to the normalized predicted workload of the given emulation during the decision period.

7. The non-transitory tangible computer-readable storage medium of claim 6, wherein when the CPU processor cores of the host computer system are heterogeneous, the optimization function comprises an optimization feature to minimize a number of CPU processor core reassignments between emulations between subsequent decision periods.

8. The non-transitory tangible computer-readable storage medium of claim 6, wherein the step of predicting estimated individual workloads for each emulation comprises using a statistical model of each emulation's past workload history to predict the future workload levels of the emulations during the set of decision periods.

9. The non-transitory tangible computer-readable storage medium of claim 6, wherein the step of predicting estimated individual workloads for each emulation comprises using a machine learning regression algorithm or a neural network model to predict the future workload levels of the emulations during the set of decision periods.

10. The non-transitory tangible computer-readable storage medium of claim 6, further comprising instructions which, when executed by the computer, cause the computer to further perform a method step of determining actual workload for each emulation during each decision period and using the actual workload to calculate updated estimated individual workloads for each emulation for subsequent decision periods of the predictive time span.

11. A host computer system, comprising:
a set of CPU processor cores;
a set of emulations using physical resources provided by the set of CPU processor cores;
a workload predictor to generate estimated individual workloads for each emulation in a set of emulations for each decision period of a set of decision periods over a predictive time span;
a Mixed Integer Programming (MIP) engine to determine sets of CPU processor cores to be allocated to each emulation during each decision period over the predictive time span based on the predicted estimated individual workloads for each emulation in the set of emulations generated by the workload predictor, a set of constraints, and an optimization function; and
a hypervisor to dynamically allocate sets of CPU processor cores to each emulation during each decision period over the predictive time span based on an output from the MIP engine;
wherein when the CPU processor cores of the host computer system are homogeneous, the set of constraints comprises:
a first constraint specifying that for all decision periods, the sum of the number of CPU processor cores assigned to all of the emulations is equal to a total number of CPU processor cores in the host computer system; and
a second constraint specifying that for all decision periods, the normalized workload of each emulation, during the decision period, is less than the amount of collective processing capacity of the set of CPU processor cores allocated to that emulation.

12. The host computer system of claim 11, wherein the workload predictor uses a statistical model of each emulation's past workload history to predict the future workload levels of the emulations during the set of decision periods.

13. The host computer system of claim 11, wherein the workload predictor uses a machine learning regression algorithm or a neural network model to predict the future workload levels of the emulations during the set of decision periods.

14. The host computer system of claim 11, wherein when the CPU processor cores of the host computer system are homogeneous, the optimization function comprises
a first optimization feature to maximize the minimum spare capacity allocated to each emulation over the predictive time span to provide enhanced fault tolerance in the event of sudden workload changes; and
a second optimization feature to minimize a number of CPU processor core reassignments between emulations between subsequent decision periods.

15. The host computer system of claim 11, wherein the workload predictor is configured to determine actual workload for each emulation during each decision period and, using the actual workload, to calculate updated estimated individual workloads for each emulation for subsequent decision periods of the predictive time span.

16. A host computer system, comprising:
a set of CPU processor cores;
a set of emulations using physical resources provided by the set of CPU processor cores;
a workload predictor to generate estimated individual workloads for each emulation in a set of emulations for each decision period of a set of decision periods over a predictive time span;
a Mixed Integer Programming (MIP) engine to determine sets of CPU processor cores to be allocated to each emulation during each decision period over the predictive time span based on the predicted estimated individual workloads for each emulation in the set of emulations generated by the workload predictor, a set of constraints, and an optimization function; and
a hypervisor to dynamically allocate sets of CPU processor cores to each emulation during each decision period over the predictive time span based on an output from the MIP engine;
wherein when the CPU processor cores of the host computer system are heterogeneous, the set of constraints comprises:
a first constraint specifying that for all decision periods, the sum of the number of CPU processor cores assigned to the set of emulations is equal to the total number of CPU processor cores in the host computer system;
a second constraint specifying that for all decision periods, each CPU processor cores is assigned to exactly one emulation and that no CPU processor core is unassigned; and
a third constraint specifying that for all decision periods, and for all emulations, the sum of the capacity of the CPU processor cores assigned to any given emulation will be greater than or equal to the normalized predicted workload of the given emulation during the decision period.

17. The host computer system of claim 16, wherein when the CPU processor cores of the host computer system are heterogeneous, the optimization function comprises an optimization feature to minimize a number of CPU processor core reassignments between emulations between subsequent decision periods.

18. The host computer system of claim 16, wherein the workload predictor uses a statistical model of each emulation's past workload history to predict the future workload levels of the emulations during the set of decision periods.

19. The host computer system of claim 16, wherein the workload predictor uses a machine learning regression algorithm or a neural network model to predict the future workload levels of the emulations during the set of decision periods.

20. The host computer system of claim 16, wherein the workload predictor is configured to determine actual workload for each emulation during each decision period and, using the actual workload, to calculate updated estimated individual workloads for each emulation for subsequent decision periods of the predictive time span.

* * * * *